United States Patent
Wang et al.

(10) Patent No.: US 11,636,180 B2
(45) Date of Patent: Apr. 25, 2023

(54) FLIGHT PUSHBACK STATE MONITORING METHOD BASED ON MULTI-MODAL DATA FUSION

(71) Applicant: THE 28TH RESEARCH INSTITUTE OF CHINA ELECTRONICS TECHNOLOGY GROUP CORPORATION, Nanjing (CN)

(72) Inventors: Xuan Wang, Nanjing (CN); Wenyi Tang, Nanjing (CN); Hui Ding, Nanjing (CN); Jibo Huang, Nanjing (CN); Yan Liu, Nanjing (CN); Qiucheng Xu, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 0 days.

(21) Appl. No.: 17/882,486

(22) Filed: Aug. 5, 2022

(65) Prior Publication Data
US 2022/0402626 A1 Dec. 22, 2022

Related U.S. Application Data

(63) Continuation of application No. PCT/CN2022/101836, filed on Jun. 28, 2022.

(30) Foreign Application Priority Data

Sep. 28, 2021 (CN) .......................... 202111141715.5

(51) Int. Cl.
*G06F 18/25* (2023.01)
*G06V 20/40* (2022.01)
(Continued)

(52) U.S. Cl.
CPC .............. *G06F 18/25* (2023.01); *G06V 20/41* (2022.01); *G08G 5/065* (2013.01); *B64D 45/0005* (2013.01); *B64D 2045/0085* (2013.01)

(58) Field of Classification Search
CPC ......... G06F 18/25; G06V 20/41; G08G 5/065
(Continued)

(56) References Cited

U.S. PATENT DOCUMENTS 11,254,445 B2 * 2/2022 Cox ...................... G05D 1/0027
2008/0077397 A1   3/2008 Shimohata
(Continued)

FOREIGN PATENT DOCUMENTS

CN       109448493 A    3/2019
CN       112397071 A    2/2021

*Primary Examiner* — Charles A Fox
*Assistant Examiner* — Michael E Butler
(74) *Attorney, Agent, or Firm* — CBM Patent Consulting, LLC

(57) ABSTRACT

A flight pushback state monitoring method based on multi-modal data fusion comprises: 1, constructing a control intention recognition rule, and recognizing a pushback intention from a control instruction sent by a controller; 2, constructing a flight intention recognition model, extracting an aircraft action from a real-time monitoring video, and capturing a flight intention; and 3, constructing an intention alignment fusion rule, and judging whether control intention information conflicts with flight intention information; by fusing the control intention and the flight intention, the method can realize the following auxiliary functions: timely judging whether the aircraft follows the pushback instruction sent by the controller, if a captain does not act according to the control instruction or acts arbitrarily without a control instruction, giving an inconsistent alarm, and a function of monitoring the flight pushback state is implemented.

9 Claims, 2 Drawing Sheets

(51) Int. Cl.
 G08G 5/06 (2006.01)
 B64D 45/00 (2006.01)
(58) Field of Classification Search
 USPC .............................................. 701/3
 See application file for complete search history.

(56) References Cited

U.S. PATENT DOCUMENTS

| | | | |
|---|---|---|---|
| 2020/0013301 A1* | 1/2020 | Vana | B64C 25/405 |
| 2021/0065561 A1* | 3/2021 | Sprengart | G07C 5/0816 |
| 2021/0362878 A1* | 11/2021 | Vana | B64D 43/00 |

\* cited by examiner

FLIGHT PUSHBACK STATE MONITORING METHOD BASED ON MULTI-MODAL DATA FUSION

CROSS REFERENCES

This application is the U.S. continuation application of International Application No. PCT/CN2022/101836 filed on 28 Jun. 2022 which designated the U.S. and claims priority to Chinese Application No. CN202111141715.5 filed on 28 Sep. 2021, the entire contents of each of which are hereby incorporated by reference.

TECHNICAL FIELD

The present invention belongs to the technical field of air traffic control automation systems, and more particularly, relates to a flight pushback state monitoring method based on multi-modal data fusion.

BACKGROUND

With the vigorous development of the global civil aviation industry, the demand for air traffic management is constantly expanding, resulting in increasingly prominent security risks. A flight on a stand which does not execute a pushback instruction of a controller, and pushes out without authorization after a period of time, may lead to taxiway conflicts and cause safety hazards. The current disposal process is as follows: A flight pushing out of a stand after a certain period of time and taxing on a taxiway, may be regarded as an invalid act, and the controller may issue an instruction to let the flight slide into the stand again. This process has a huge safety risk, i.e., the flight may be detected only after the flight has taxied to the taxiway, which may cause serious consequences when the taxiway conflicts or the surface is busy. To deal with this problem, the controller can only rely on a surface monitoring system for real-time tracking, which leads to the lag and low efficiency of discovering problem.

The difficulty of this problem lies in the fact that: there is no system that can recognize an intention of the controller and a flight intention currently, so it is difficult to judge whether the two intentions are consistent or not, and it is impossible to prevent a conflict problem caused by non-execution of instructions or unauthorized execution of instructions.

SUMMARY

Object of the present invention: the technical problem to be solved by the present invention is to provide a flight pushback state monitoring method based on multi-modal data fusion aiming at the deficiencies of the prior art.

Technical solutions: the present invention provides a flight pushback state monitoring method based on multi-modal data fusion, comprising the following steps.

Step 1: constructing a control intention recognition rule, and extracting a control intention from a control instruction text.

Step 2: constructing a flight intention recognition model, and extracting the flight intention from a surface monitoring video.

Step 3: designing an intention alignment rule to align control intentions and flight intentions at different time.

Step 4: judging intention matching, and fusing the control intention and the flight intention aligned to judge whether the control intention and the flight intention aligned are inconsistent; and when the control intention and the flight intention aligned are inconsistent, triggering an alarm; correcting status of the flight or controller's guide.

In one implementation, in step 1, the constructing the control intention recognition rule comprises: analyzing existing control instruction texts, sorting out a syntactic structure and a vocabulary distribution of instructions related to pushback and start-up processes, and constructing a keyword dictionary; and implementing control intention recognition by using a dictionary traversal method.

The instructions related to the pushback and start-up processes comprise a flight number, an action, a start position and an end position.

The keyword dictionary comprises a flight action dictionary, a surface position dictionary and a flight number dictionary, the flight action dictionary comprises keywords of the instructions related to the pushback and start-up processes comprising pushback, start-up, pushback for start-up, and pushback and start-up; the surface position dictionary comprises keywords of initial position and end position related to the pushback and start-up processes comprising a stand and a taxiway position string; and the flight number dictionary comprises a flight number in flight information collected from a control automation system.

The advantage of constructing the keyword dictionary is that key information can be quickly extracted from the control instruction text by traversing the dictionary, which is helpful to accurately extract the control intention information.

In one implementation, in step 1, the extracting the control intention from the control instruction text comprises: converting a control voice into a control instruction text; and traversing the keyword dictionary, matching instructions related to the pushback and start-up processes in the control instruction text, and generating and storing a structured instruction.

In one implementation, in step 1, the traversing the keyword dictionary, and matching the instructions related to the pushback and start-up processes in the control instruction text comprises: traversing the keywords in the flight action dictionary, filtering to obtain the control instruction text in a pushback and start-up scenario, and extracting the action;

traversing all position strings in the surface position dictionary, and extracting the initial position and the end position from the control instruction text in the pushback and start-up scenario; and traversing the flight number information in the flight action dictionary, and extracting a flight number string from the control instruction text in the pushback and start-up scenario.

In one implementation, in step 1, the generating and storing the structured instruction comprises: gathering the information from the instructions related to the pushback and start-up processes in the matched control instruction text to form the structured instruction, and labeling the structured instruction, and an issuing time of the related instructions into a database, wherein the formats are as follows.

{"structured instruction": {"flight": flight number string, "action": pushback and start-up, "initial position": stand name, and "end position": taxiway name};
"control intention": pushback; and
"instruction time": hour-minute-second
}.

The structured instruction is shown above, a control intention of the structured instruction and the issuing time of the related instructions are stored into a database Through the above steps, the structured information of the control instruction can be extracted, and the control intention information can be captured quickly and effectively.

In one implementation, in step 2, the constructing the flight intention recognition model comprises: monitoring a surface stand by using a high resolution camera, collecting stand monitoring video data, dividing images by region, forming monitoring images for single stand, setting a length and a width of the monitoring image to be both n, and labeling the monitoring images to construct a test data set; constructing an image classification model based on a convolutional neural network, wherein the image classification model is capable of recognizing three flight state types: the first type is that the flight is on the stand, that is, in an unmoving state; the second type is that a part of the flight is on the stand, that is, in an uncertain state; and the third type is that the flight is not on the stand, that is, in a moving state; and training the image classification model by using the test data set.

Because the camera can monitor a plurality of stands at the same time, the image divided by region needs to be preprocessed, and a video frame is divided by regions to form the monitoring images for single stand. The labeling the monitoring images, i.e., labeling the flight state type of the monitoring images, comprises the unmoving state, the uncertain state and the moving state; test data of the three flight state types are equally distributed as sample data to train the image classification model.

In one implementation, in step 2, the image classification model comprises three parts, which are a convolution layer, a pooling layer and a fully connected layer. Assuming that an input image is $x \in R^{n_1 \times n_2}$, wherein $n_1$ denotes a length of the input image, $n_2$ denotes a width of the image, which means that the input image is an $n_1 \times n_2$ dimensional matrix, and R denotes a set of real numbers; and assuming that the convolution layer comprises F m×m dimensional convolution kernels, and $m \in [3,5,7]$ denotes a size of the convolution kernel, a net activation output $u_f \in R^{m \times m}$ an $f^{th}$ feature map of the convolution layer is obtained by calculating according to formula 1, wherein $w_f$ denotes an $f^{th}$ convolution kernel, and $b_f$ denotes an offset of the convolution kernel.

$$u_f = x * w_f + b_f, f \in [1, F] \quad (1).$$

The $u_f$ is input into a sigmoid activation function to obtain the $f^{th}$ feature map $x_f^1$.

$$x_f^1 = \text{sigmoid}(u_f) = \frac{1}{1 + \varepsilon^{u_f}}. \quad (2)$$

The $f^{th}$ feature map is input into the pooling layer, and then an output signal of the pooling layer is input into the sigmoid activation function to obtain an $f^{th}$ output result $x_f^2$.

$$u_f^2 = \beta_f \text{down}(x_f^1) + b_f^2, x_f^2 = \text{sigmoid}(u_f^2) \quad (3).$$

down( ) denotes a pooling function, and a common pooling function comprises maximum pooling and average pooling functions. $\beta_f$ denotes a weight parameter of the pooling layer, $b_f^2$ denotes an offset parameter of the pooling layer, and $u_f^2$ denotes the output signal of the pooling layer; and Finally, output results are spliced according to a number of F to form a vector and then input to the fully connected layer.

$$u^o = w^o \text{conc}(x_1^2, x_2^2, \ldots x_F^2) + b^o, y = \text{softmax}(u^o) \quad (4).$$

conc( ) denotes feature splicing processing, $w^o$ denotes a weight parameter of the fully connected layer, $b^o$ denotes an offset parameter of the fully connected layer, $u^o$ denotes an output signal of the fully connected layer, softmax( ) denotes a normalization processing function, an output $y \in R^{1 \times 3}$ denotes normalization probabilities of the three types, and finally the type with the highest probability is taken as a classification result.

In one implementation, in step 2, the extracting the flight intention from the surface monitoring video comprises: positioning flights on the stands, and obtaining the flight numbers of the flights on each stand with reference to flight information on target stands provided by an Advanced Ground Activity Guidance and Control System (A-SMGCS); and positioning different stands by using fixed positions of the surface monitoring camera to position the flight numbers on the different stands;

judging whether the flight is pushed back or not, sampling the real-time monitoring video data, capturing sampled monitoring images, setting an interval between two sampling as T, inputting the sampled monitoring images into the image classification model, and outputting the classification result, which is the flight state type; and detecting the flight state types in three consecutive sampled monitoring images, and determining that the flight is already pushed back when the flight state types in the three consecutive sampled monitoring images are the unmoving state, the uncertain state and the moving state in turn; and associating the flight information, the pushback state and a pushback time, wherein the pushback time is subjected to a time of a second frame sampled monitoring image, and the formats are as follows.

{"flight": flight number string;
"control intention": pushback; and
"instruction time": hour-minute-second
}.

The above contents are stored in the database.

Through the above method, the image classification model may extract an actual running state of the flight from the video data, and extract the flight intention information according to the actual state of the flight.

In one implementation, in step 3, the intention alignment rule is designed to align the control intention with the flight intention according to a time range. In actual operation, when the controller issues an instruction, a captain then executes the instruction and pushes out an aircraft. Therefore, it can be known that the flight intention needs to be after a time of the control intention. Therefore, it is assumed that a time interval between the two is $T_1$.

In one implementation, in step 4, the database is traversed in real time, and when a pushback control intention is searched out from the database, the flight number is extracted, and meanwhile, it is searched whether a pushback intention of the flight appears in the following time period of $T_1$. When the pushback intention of the flight exists, it is indicated that the pushback instruction is already executed by the flight caption; otherwise, the pushback instruction is not executed. Similarly, when a pushback intention of the flight is searched out from the database; when the control intention of the same flight is not found in the previous time period of $T_1$, it is indicated that the flight acts without authorization, resulting in inconsistent intentions. In this case, an alarm function may be triggered, prompting the controller to issue related instructions to adjust the subsequent operation of the flight to avoid possible conflicts.

According to the result of step 4, the present invention monitors the pushback state of the flight in real time and realizes the alarm function.

The method according to the present invention is loaded and operated in a computer of a surface automatic monitoring system, or a computer of a control automation system, or a computer device used for airport air traffic control.

Beneficial effects: according to the method provided by the present invention, the control intention can be quickly extracted from the control instruction by constructing the control intention recognition rule; meanwhile, the flight intention recognition model is constructed to analyze the flight state in the monitoring video and capture a real-time flight operation intention; and finally, the two intentions are fused to judge the intention consistency, thus realizing the function of monitoring the pushback state of the flight in real time. The above method can effectively prevent the conflict caused by the non-execution of the instruction by means of processing multimodal data such as the control instruction text and the surface monitoring video, and fusing the control intention and the flight operation intention. That is, the present invention prevents taxiway conflicts from the perspective of intention consistency judgment, and constructs an intention recognition model to extract the control intention and the flight intention; and then, fuse the intentions to judge whether the intentions are consistent or not, and gives an alarm to the inconsistent intention, so as to improve the flight pushback state monitoring ability.

BRIEF DESCRIPTION OF THE DRAWINGS

The advantages of the above or other aspects of the present invention will become more apparent by further explaining the present invention with reference to the following drawings and detailed description.

DETAILED DESCRIPTION

The present invention is further explained with reference to the drawings and embodiments hereinafter.

The present invention may be applied to an air traffic control system to judge whether a pushback intention of a control instruction is executed. The present invention can effectively judge instruction execution situations.

A control automation system, a calling system, a control voice recognition system and a surface automatic monitoring system mentioned in the embodiments of this application are all systems well known to those skilled in the art.

Figure 1:
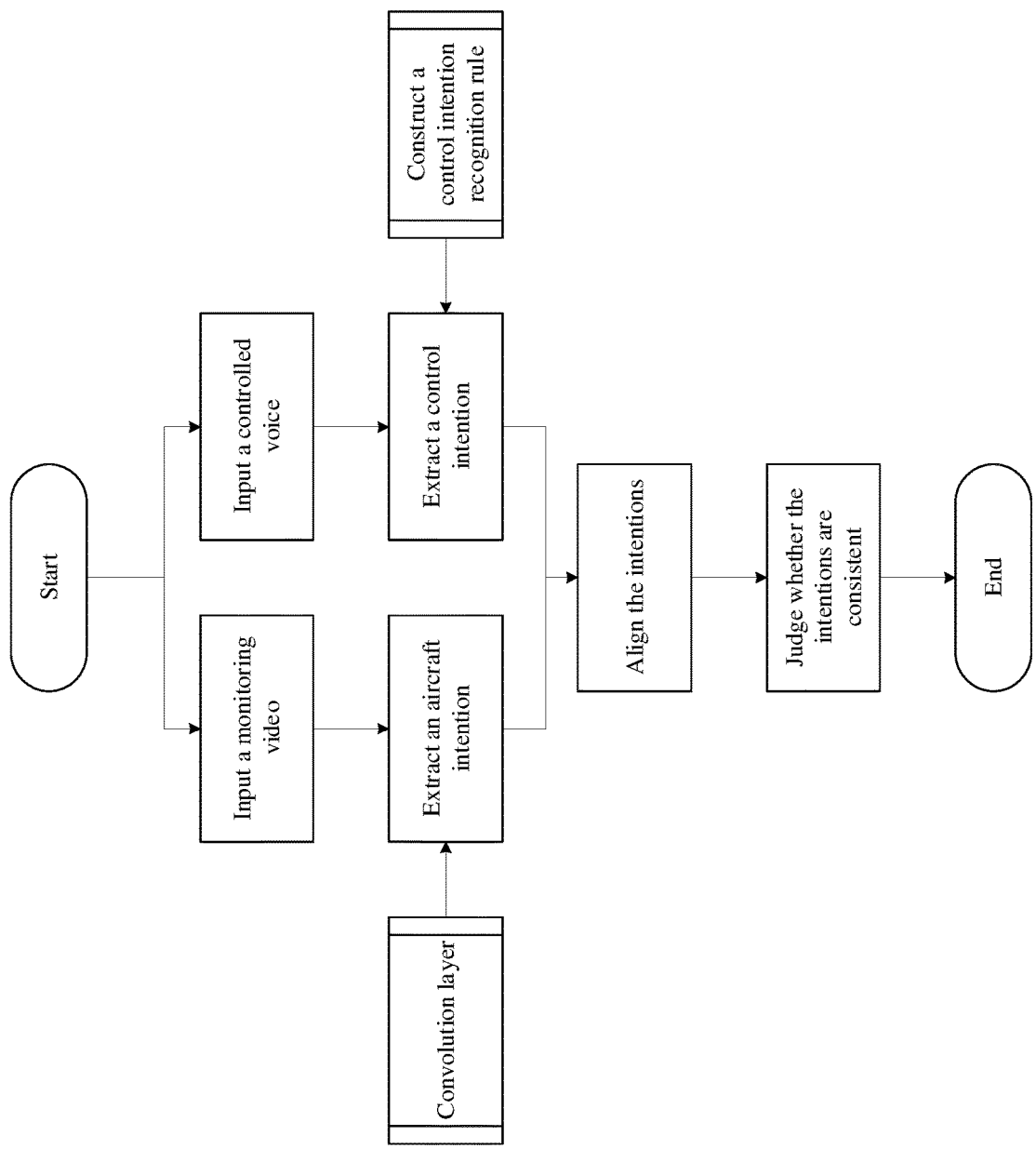
FIG. 1 is a flowchart of a flight pushback state monitoring method based on multi-modal data fusion.

An implementation process and steps of the present invention are as follows, and the process is as shown in FIG. 1.

At step 1, a control intention recognition rule is constructed, and a control intention is extracted from a control instruction text. A vocabulary and a syntactic structure of the control instruction are analyzed, and a keyword dictionary is constructed, comprising basic knowledge such as a flight number, a taxiway and a stand, and scenario keywords such as pushback and start-up, or the like. Controlled air-ground communication contents are monitored in real time, a controlled voice signal is translated by using a control voice recognition system, the control instruction text is generated, then the keyword dictionary is traversed to detect whether the control instruction comprises keywords such as pushback, start-up, pushback for start-up and pushback and start-up, and filter the control instruction text in the pushback and start-up scenario. A control intention extraction rule is constructed for the pushback and start-up scenario, and information such as a flight number, a taxiway number and a stand in the dictionary is traversed, and key information is matched and extracted to generate a structured control instruction, which is stored in a database according to a corresponding format.

At step 2, a flight intention recognition model is constructed, and the flight intention is extracted from a surface monitoring video. An image classification model is constructed and trained, videos generated by monitoring cameras in all stands are sampled, images are grabbed, a sampling interval is defined as T, sampled image data is pre-processed, regions are divided according to different stands, and input image data is generated. The data is processed by using the image classification model to obtain a classification result and judge whether the flight moves or not.

Figure 2:
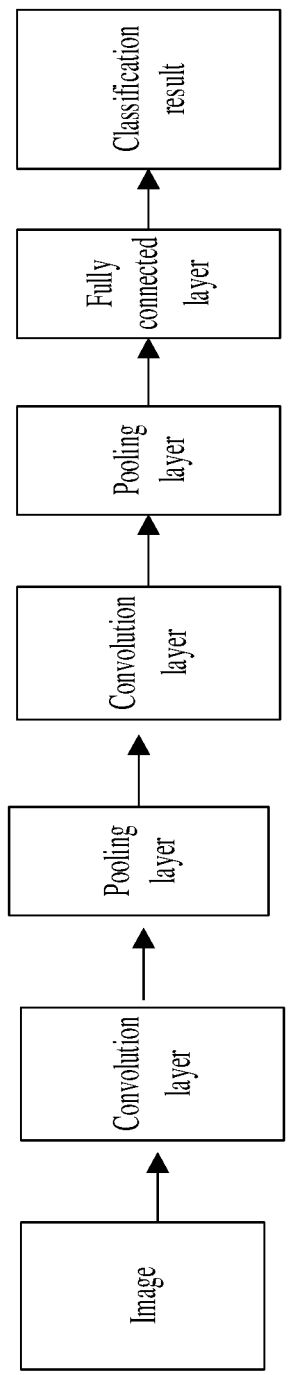
FIG. 2 is a schematic structural diagram of an image classification model.

As shown in FIG. 2, the image classification model comprises three parts, which are a convolution layer, a pooling layer and a fully connected layer. Assuming that an input monitoring image is $x \in R^{n_1 \times n_2}$, wherein $n_1$ denotes a length of the input image, $n_2$ denotes a width of the image, which means that the input image is an $n_1 \times n_2$ dimensional matrix, and R denotes a set of real numbers; in this embodiment, $n_1$=pixels, and $n_2$=180 pixels; and assuming that the convolution layer comprises F m×m dimensional convolution kernels, and $m \in [3,5,7]$ denotes a size of the convolution kernel, a net activation output $u_f \in R^{m \times m}$ of an feature map of the convolution layer is obtained by calculating according to formula 1, wherein $w_f$ denotes an $f^{th}$ convolution kernel, and $b_f$ denotes an offset of the $f^{th}$ convolution kernel.

$$u_f = x * w_f + b_f, f \in [1,F] \quad (1).$$

A convolution value on position (t,k) is obtained by convolution operation $$x * w_f(t,k) = \Sigma_i \Sigma_j x(t+i,k+j) w(i,j), \text{ wherein}$$

$$\in [0,n_1-1], k \in [0,n_2-1], i \in [0,m-1], j \in [0,m-1].$$

The $u_f$ is input into a sigmoid activation function to obtain the feature map $x_f^1$, which is as shown in formula 2.

$$x_f^1 = \text{sigmoid}(u_f) = \frac{1}{1+\varepsilon^{u_f}}. \quad (2)$$

The $f^{th}$ feature map is input into the pooling layer, and then an output signal of the pooling layer is input into the sigmoid activation function to obtain an $f^{th}$ output result $x_f^2$ which is as shown in formula 3.

$$u_f^2 = \beta_f \text{down}(x_f^1) + b_f^2, x_f^2 = \text{sigmoid}(u_f^2) \quad (3).$$

down( ) denotes a pooling function, $b_f^2$ denotes an offset parameter of the pooling layer, and $u_f^2$ denotes the output signal of the pooling layer.

Finally, output results are spliced according to a number of F to form a vector and then input to the fully connected layer, which is as shown in formula 4.

$$u^o = w^o \text{conc}(x_1^2, x_2^2, \ldots x_F^2) + b^o, y = \text{softmax}(u^o) \quad (4).$$

conc( ) denotes feature splicing processing, $w^o$ denotes a weight parameter of the fully connected layer, $b^o$ denotes an offset parameter of the fully connected layer, u° denotes an output signal of the fully connected layer, softmax( ) denotes a normalization processing function, an output $y \in R^{1 \times 3}$ denotes normalization probabilities of the three types, and finally the type with the highest probability is taken as a classification result.

If the classification results of adjacent three images are in the unmoving state, the uncertain state and the moving state in turn, then the flight on this stand is already pushed back. The stand can be locked by a camera position and a stand region, and the flight number on this stand can be extracted by combining A-SMGCS and other systems. The structured data is constructed based on the time of the second sampled image and with reference to the flight number, and stored in the database according to a corresponding format.

At step 3, control intentions are aligned. A time interval is defined as $T_1$, if an interval between a time corresponding to the control intention and a time corresponding to the flight intention in the database is no more than $T_1$, then the two types of intentions are aligned. Through traversing the structured data of the two types of intentions in the database, the aligned intention information is correlated and aggregated.

At step 4, intention consistency is judged. It is analyzed whether the same flight number appears in the aligned intention information. When the same flight number exists, it is indicated that the pushback instruction is already executed by a flight caption; if the flight numbers are the same, but the time difference between the two types of intentions is more than $T_1$, it is indicated that the pushback instruction is not executed; if the flight numbers are the same, but the flight intention is earlier than the control intention or there is no control intention, it is indicated that the flight acts arbitrarily without receiving a pushback instruction, thus triggering an alarm.

According to the result of step 4, a pushback state of the flight is monitored in real time and the alarm function is realized.

First Embodiment

Flight CES3485 docked at a stand 12, was ready and waiting for pushback. At 8:30 BJT, a controller issued a control instruction that: Flight CES3485, pushback from a stand 02 and wait at Alpha. A captain heard the instruction and immediately pushed back from the stand and arrived at a taxiway four minutes later. The method in this embodiment was loaded and operated in a computer of a control automation system.

At step 1, a calling system was monitored by the control automation system in real time, a controlled voice was translated into a control instruction text by using a control voice recognition system, and a flight action dictionary in a keyword dictionary was traversed to match words such as "pushback", and "start-up", or "pushback and start-up", and filter the control instruction, and extract the keyword "pushback". Other information was extracted by traversing the dictionary, and the flight number dictionary was obtained according to planning information in the control automation system. The flight number matched by traversing the flight number dictionary was CES3485, which was matched from airport basic information in a surface position dictionary to obtain the information that the stand was 02 and the taxiway was Alpha. After that, a structured instruction was generated, with a format as follows:

{"structured instruction": {"flight": CES3485, "action": pushback, "initial position": stand 12, and "end position": taxiway A};
"control intention": pushback; and
"instruction time": 08-30-00
}.

The structured instruction was stored in the database.

At step 2, a surface automatic monitoring system sampled the monitored videos regularly, and an interval time T was set as one minute. In the video data of the monitored stand 12, images were sampled at 8:31, 8:32 and 8:33 respectively, and preprocessed to cut the images into 384×180 dimensional input monitoring image data. An image classification model was constructed, and the sampled image data was input into the image classification model for judgment. The results were as follows.

At 8:31, the flight was still on the stand, so the classification result was: unmoving.

At 8:32, a part of the flight was on the stand, so the classification result was: uncertain.

At 8:33, no aircraft was on the stand, so the classification result was: moving.

As the states of the continuously sampled three images were unmoving, uncertain and moving, it could be known that the flight was already pushed back from the stand, and the pushback time was subjected to the time of the secondly sampled image, i.e., 8:32. According to systems such as A-SMGCS, it could be judged that a flight number of the flight on the stand 12 was CES3485.

After that, structured information was generated, with a format as follows:

{"flight": CES3485;
"flight intention": pushback; and
"pushback time": 08-32-00
}.

The structured information was stored in the database.

At step 3, an interval $T_1$ between a voice time and an image time was defined as five minutes, i.e., when the controller issued an instruction, the flight should be pushed back from the stand within five minutes.

At step 4, the database was searched, finding that pushback intention data of the flight appeared two minutes after voice pushback intention data was stored, so the two intentions were consistent, and the flight CES3485 was pushed back according to the control instruction.

Second Embodiment

Flight CES3485 docks at a stand 12, and is being pushed back. However, before 10 minutes, i.e., 8:30 BJT, a controller issued a control instruction that: Flight CES3485, pushback from stand 02 and wait at Alpha. A captain heard the instruction, did not immediately push back from the stand, but push back after 10 minutes. The method was loaded and operated in a computer of a surface automatic monitoring system.

At step 1, a calling system was monitored by the control automation system in real time, a controlled voice was translated into a control instruction text by using a control voice recognition system, and a flight action dictionary in a keyword dictionary was traversed to match words such as "pushback", and "start-up", or "pushback and start-up", and filter the control instruction, and extract the keyword "pushback". Other information was extracted by traversing the dictionary, and the flight number dictionary was obtained according to planning information in the control automation system. The flight number matched by traversing the flight number dictionary was CES3485, which was matched from airport basic information in a surface position dictionary to obtain the information that the stand was 02 and the taxiway was Alpha. After that, a structured instruction was generated, with a format as follows:

```
{"structured instruction": {"flight": CES3485, "action": pushback,
 "initial position": stand 12, and "end position": taxiway A};
 "control intention": pushback; and
 "instruction time": 08-30-00
 }.
```

The structured instruction was stored in the database.

At step 2, the surface automatic monitoring system sampled the monitored videos regularly, and an interval time was one minute. In the video data of the monitored stand 12, images were sampled at 8:40, 8:41 and 8:42 respectively, and preprocessed to cut the images into 384×180 dimensional input monitoring image data. An image classification model was constructed, and the sampled image data was input into the image classification model for judgment. The results were as follows.

At 8:40, the flight was still on the stand, so the classification result was: unmoving.

At 8:41, a part of the flight was on the stand, so the classification result was: uncertain.

At 8:42, no aircraft was on the stand, so the classification result was: moving.

As the states of the continuously sampled three images were unmoving, uncertain and moving in sequence, it could be known that the flight was already pushed back from the stand, and the pushback time was subjected to the time of the secondly sampled image, i.e., 8:41. According to systems such as A-SMGCS, it could be judged that a flight number of the flight on the stand 12 was CES3485.

After that, structured information was generated, with a format as follows:

```
{"flight": CES3485;
 "flight intention": pushback; and
 "pushback time": 08-41-00
 }.
```

The structured information was stored in the database.

At step 3, an interval $T_1$ between a voice time and an image time was defined as five minutes, i.e., when a controller issued an instruction, the flight should be pushed back from the stand within five minutes.

At step 4, the database was searched, finding that the pushback intention data of the flight appeared 11 minutes after the voice pushback intention data was stored. Although the two intentions were consistent, the time difference exceeded the specified time range $T_1$, so the flight CES3485 was not pushed back according to the control instruction. In this case, the alarm function was triggered, prompting the controller to issue related instructions to adjust the subsequent operation of the flight, so as to avoid possible conflicts.

Third Embodiment

The method of the present invention is applied to a computer device used for airport air traffic control.

In a specific implementation, the present application provides a computer storage medium and a corresponding data processing unit, wherein the computer storage medium is capable of storing a computer program, and the computer program, when executed by the data processing unit, can run the inventive contents of the flight pushback state monitoring method based on multi-modal data fusion provided by the present invention and some or all steps in various embodiments. The storage medium may be a magnetic disk, an optical disk, a Read Only Storage (ROM) or a Random Access Storage (RAM), and the like.

Those skilled in the art can clearly understand that the technical solutions in the embodiments of the present invention can be realized by means of a computer program and a corresponding general hardware platform thereof. Based on such understanding, the essence of the technical solutions in the embodiments of the present invention or the part contributing to the prior art, may be embodied in the form of a computer program, i.e., a software product. The computer program, i.e., the software product is stored in a storage medium comprising a number of instructions such that a device (which may be a personal computer, a server, a singlechip, a MUU or a network device, and the like) comprising the data processing unit executes the methods described in various embodiments or some parts of the embodiments of the present invention.

The present invention provides the flight pushback state monitoring method based on multi-modal data fusion. There are many methods and ways to realize the technical solutions. The above is only the preferred embodiments of the present invention. It should be pointed out that those of ordinary skills in the art can make some improvements and embellishments without departing from the principle of the present invention, and these improvements and embellishments should also be regarded as falling with the scope of protection of the present invention. All the unspecified components in the embodiments can be realized by the prior art.

What is claimed is:

1. A flight pushback state monitoring method based on multi-modal data fusion, comprising the following steps of:
   step 1: constructing a control intention recognition rule, and extracting a control intention from a control instruction text;
   step 2: constructing a flight intention recognition model, and extracting the flight intention from a surface monitoring video;
   step 3: designing an intention alignment rule to align control intentions and flight intentions at different times; and
   step 4: judging intention matching, and fusing the control intention and the flight intention aligned to judge whether the control intention and the flight intention aligned are inconsistent; and when the control intention and the flight intention aligned are inconsistent, triggering an alarm;
   in step 2, the constructing the flight intention recognition model comprises: monitoring a surface stand by using a high resolution camera, collecting stand monitoring video data, dividing images by region, forming monitoring images for single stand, and labeling the monitoring images to construct a test data set; constructing an image classification model based on a convolutional neural network, wherein the image classification model is capable of recognizing three flight state types: the first type is that the flight is on the stand, that is, in an unmoving state; the second type is that a part of the flight is on the stand, that is, in an uncertain state; and the third type is that the flight is not on the stand, that is, in a moving state; and training the image classification model by using the test data set.

2. The flight pushback state monitoring method based on multi-modal data fusion according to claim 1, wherein in step 1, the constructing the control intention recognition rule comprises: analyzing existing control instruction texts, sorting out a syntactic structure and a vocabulary distribution of instructions related to pushback and start-up processes, and constructing a keyword dictionary; and implementing control intention recognition by using a dictionary traversal method;

the instructions related to the pushback and start-up processes comprise a flight number, an action, a start position and an end position; and the keyword dictionary comprises a flight action dictionary, a surface position dictionary and a flight number dictionary, the flight action dictionary comprises keywords of the instructions related to the pushback and start-up processes comprising pushback, start-up, pushback for start-up, and pushback and start-up; the surface position dictionary comprises keywords of initial position and end position related to the pushback and start-up processes comprising a stand and a taxiway position string; and the flight number dictionary comprises a flight number in flight information collected from a control automation system.

3. The flight pushback state monitoring method based on multi-modal data fusion according to claim 2, wherein in step 1, the extracting the control intention from the control instruction text comprises: converting a control voice into a control instruction text; and traversing the keyword dictionary, matching instructions related to the pushback and start-up processes in the control instruction text, and generating and storing a structured instruction.

4. The flight pushback state monitoring method based on multi-modal data fusion according to claim 3, wherein in step 1, the traversing the keyword dictionary, and matching the instructions related to the pushback and start-up processes in the control instruction text comprises:

traversing the keywords in the flight action dictionary, filtering to obtain the control instruction text in a pushback and start-up scenario, and extracting the action;

traversing all position strings in the surface position dictionary, and extracting the initial position and the end position from the control instruction text in the pushback and start-up scenario; and traversing the flight number information in the flight action dictionary, and extracting a flight number string from the control instruction text in the pushback and start-up scenario.

5. The flight pushback state monitoring method based on multi-modal data fusion according to claim 4, wherein in step 1, the generating and storing the structured instruction comprises: gathering the information extracted from the instructions related to the pushback and start-up processes in the matched control instruction text to form the structured instruction, and storing the structured instruction, a control intention of the structured instruction and an issuing time of the related instructions into a database.

6. The flight pushback state monitoring method based on multi-modal data fusion according to claim 5, wherein in step 2, the image classification model comprises three parts, which are a convolution layer, a pooling layer and a fully connected layer; assuming that an input monitoring image is $x \in R^{n_1 \times n_2}$, wherein $n_1$ denotes a length of the input image, $n_2$ denotes a width of the image, which means that the input image is an $n_1 \times n_2$ dimensional matrix, and R denotes a set of real numbers; and assuming that the convolution layer comprises F m×m dimensional convolution kernels, and m∈[3,5,7] denotes a size of the convolution kernel, after the following calculation:

$$u_f = x * w_f + b_f, f \in [1, F] \quad (1)$$

obtaining a net activation output $u_f \in R^{m \times m}$ of an $f^{th}$ feature map of the convolution layer, wherein $w_f$ denotes an $f^{th}$ convolution kernel, and $b_f$ denotes an offset of the $f^{th}$ convolution kernel;

inputting $u_f$ into a sigmoid activation function to obtain the $f^{th}$ feature map $x_f^1$:

$$x_f^1 = \text{sigmoid}(u_f) = \frac{1}{1 + e^{u_f}} \quad (2)$$

inputting the $f^{th}$ feature map into the pooling layer, and then inputting an output signal of the pooling layer into the sigmoid activation function to obtain an $f^{th}$ output result $x_f^2$:

$$u_f^2 = \beta_f \text{down}(x_f^1) + b_f^2$$

$$x_f^2 = \text{sigmoid}(u_f^2) \quad (3)$$

wherein, down( ) denotes a pooling function, $\beta_f$ denotes a weight parameter of the pooling layer, $b_f^2$ denotes an offset parameter of the pooling layer, and $u_f^2$ denotes the output signal of the pooling layer; and finally, splicing output results according to a number of F to form a vector and then inputting the vector to the fully connected layer:

$$u^\circ = w^\circ \text{conc}(x_1^2, x_2^2, \ldots, x_F^2) + b^\circ$$

$$y = \text{softmax}(u^\circ) \quad (4)$$

wherein, conc( ) denotes feature splicing processing, $w^\circ$ denotes a weight parameter of the fully connected layer, $b^\circ$ denotes an offset parameter of the fully connected layer, $u^\circ$ denotes an output signal of the fully connected layer, softmax( ) denotes a normalization processing function, an output $y \in R^{1 \times 3}$ denotes normalization probabilities of the three types, and finally the type with the highest probability is taken as a classification result.

7. The flight pushback state monitoring method based on multi-modal data fusion according to claim 6, wherein in step 2, the extracting the flight intention from the surface monitoring video comprises:

positioning flights on the stands, and obtaining the flight numbers of the flights on each stand with reference to flight information on target stands provided by an Advanced Ground Activity Guidance and Control System A-SMGCS; and positioning different stands by using fixed positions of the surface monitoring camera to position the flight numbers on the different stands;

judging whether the flight is pushed back or not, sampling the real-time monitoring video data, capturing sampled monitoring images, setting an interval between two sampling as T, inputting the sampled monitoring images into the image classification model, and outputting the classification result, which is the flight state type; and detecting the flight state types in three consecutive sampled monitoring images, and determining that the flight is already pushed back when the flight state types in the three consecutive sampled monitoring images are the unmoving state, the uncertain state and the moving state in turn; and associating the flight number, the pushback state and a pushback time to form the structured data, and storing the structured data into the database, wherein the pushback time is subjected to a time of a second frame sampled monitoring image.

8. The flight pushback state monitoring method based on multi-modal data fusion according to claim 7, wherein in step 3, the intention alignment rule is designed to align the control intention with the flight intention according to a time range; and the flight intention needs to be set at a time interval of $T_1$ after a time of the control intention.

9. The flight pushback state monitoring method based on multi-modal data fusion according to claim 8, wherein in step 4, the database is traversed in real time, and when a pushback control intention is searched out from the database, the flight number is extracted, and meanwhile, it is searched whether a pushback intention of the flight exists in the following time period of $T_1$; when the pushback intention of the flight exists, it is indicated that the pushback instruction is already executed by a flight captain; otherwise, the pushback instruction is not executed; similarly, when a pushback intention of the flight is searched out from the database; when the control intention of the same flight is not found in the previous time period of $T_1$, it is indicated that the flight acts without authorization, resulting in inconsistent intentions.

* * * * *